June 12, 1962  R. F. SNYDER  3,038,983

CALIBRATION OF ELECTRICAL TEMPERATURE CONTROL

Filed June 30, 1958

INVENTOR.
ROBERT F. SNYDER

BY

*R. L. Miller*
ATTORNEY

United States Patent Office 3,038,983
Patented June 12, 1962

3,038,983
CALIBRATION OF ELECTRICAL TEMPERATURE CONTROL
Robert F. Snyder, Lakemore, Ohio, assignor to The Goodyear Tire & Rubber Company, Akron, Ohio, a corporation of Ohio
Filed June 30, 1958, Ser. No. 745,424
18 Claims. (Cl. 219—20)

This invention relates to method and apparatus for the calibration of electrical temperature controls and in particular to the calibration of an electrical control for an electrically heated pad.

Th use of electrically heated pads for various purposes has become increasingly more common in recent years. This is particularly true in the tire retreading art. An extremely satisfactory method of retreading a tire and an electrical system for accomplishing this is described in copending application Serial Number 665,795, filed June 14, 1957, now United States Patent 2,938,100.

The system of the copending application applies heat, for example heat generated in the customary manner by steam, to the tread forming matrix of a retread mold. The heat generated by the steam transfers radially inwardly to and through a band of new tread rubber placed on the tire casing to be retreaded. Heat is also generated by an electrical heating element or pad disposed inside the tire casing for transfer radially outwardly to the bonding area between the new tread rubber and the stripped crown of the tire casing. The electrical heating element, which may be made in accordance with the disclosure of copending application Serial Number 640,387, filed February 15, 1957, and now abandoned is usually an endless circular band in which is embedded a sinuous length of wire forming a heating coil.

The heating coil wire is made of a material that changes its electrical resistance with increased temperature, preferably in a substantially linear fashion, with the electrical resistance increasing with higher temperatures. The material used for this purpose may be so called Balco wire, which is an alloy composed substantially of 70% nickel and 30% iron, or a similar alloy. The thermally dependent resistance characteristic of the heating coil is important since it provides certain safety features in the heating unit and also permits the accurate control of the final temperature obtained at the cut-off point of the electrical control apparatus.

Certain necessary precautions must be taken in the use of the type of electrical control disclosed in the applications referred to above. Among these are the necessity for accurate setting of the control in order to assure that the temperature of the heating pad or unit closely follows the preset temperature of the control unit. The calibration involved in this procedure is not a simple one since any change in electrical characteristics of the heating unit or the control unit during calibration severely affects the final result. While it would be possible to utilize an extremely accurately manufactured heating unit for the purpose of calibration, this is not feasible due to the difficulty in maintaining fine accuracy in the band and also due to the rapid change in the electrical characteristics of the band when current is applied and also due to variations in ambient temperature conditions. The successful use of a band for calibration purposes would require that the band be placed in a mold with a tire in place and the steam turned on in order to duplicate the actual operational envirnoment, which is time consuming and laborious at best. Furthermore, supplying each field retreading installation with a special pad of each size utilized in retreading operations for calibration use is a costly waste of material and labor.

It is a primary object of the present invention to provide a method and apparatus permitting the accurate calibration of electrical systems of the type referred to.

It is a further object of the present invention to provide a calibration unit which does not vary in characteristics even though the current to which it is subjected or the environmental conditions under which it must operate fluctuate considerably.

It is a still further object of the present invention to provide a calibration apparatus which may be easily utilized by a relatively inexperienced retread operator.

It is an additional object of the present invention to provide a single calibration apparatus which may be used with a variety of electrical controls.

These and other objects of the present invention will become apparent from the following description and drawings in which.

Figure 1:
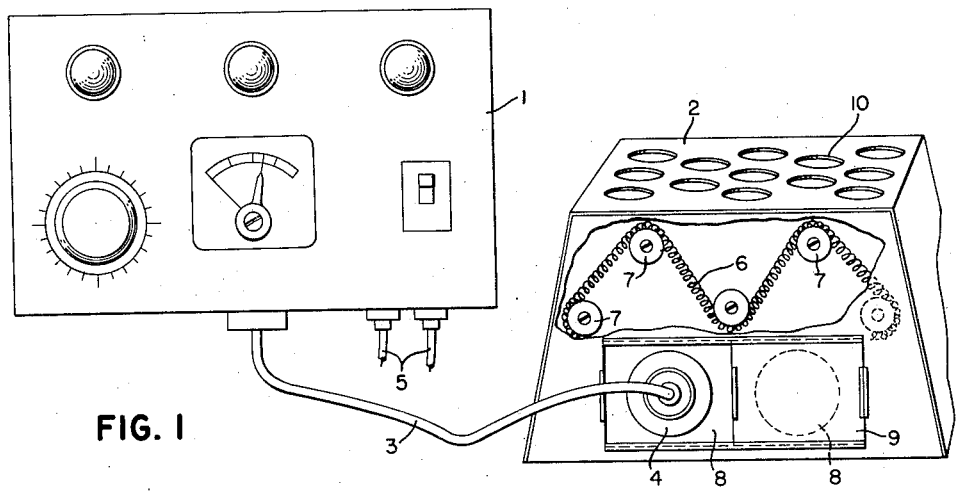
FIG. 1 illustrates a temperature control unit with a calibration apparatus attached thereto in the manner of the present invention.

The use of a standard resistor having an ohmic value equal to the desired load and utilized for the purposes of calibrating electrical controls is, of course, a common technique. However, such an approach has been found to be unsatisfactory in the calibration of temperature critical systems such as retreading apparatus utilizing an electrically heated pad. One of the reasons for the failure of this technique has been due to the fact that, in general, high currents are involved and, hence, the calibration load changes its characteristics due to heating as current flows through it. Thus, in a system requiring extremely accurate calibration in order to control temperature, the change in resistance due to the heating effect of current defeats the purpose of calibration. In has been calculated that a typical resistance utilized in 110 volt circuit may initially change its temperature at the rate of 50° F. per second with a concomitant change in resistance. Furthermore, wire which has been heated and slowly cooled has been found to have a room temperature resistance as much as 4 to 5 percent higher than before, which renders the standard technique inherently inaccurate due to this shift in cold resistance. It is apparent from this fact that the value at room temperature of a resistor having any appreciable thermal coefficient of resistance and operated under substantial currents cannot be known within the range of accuracy often required. Since a calibration procedure may require a minimum of a minute in its performance, the calibration device clearly loses its ability to function as a standard reference value for calibration purposes due to rapid changes in electrical characteristics during the calibration period.

The present invention successfully avoids these problems and provides a calibration resistance having an effective constant reference value which will remain unvaried even though the environment in which it operates may change considerably. The essence of the present invention resides generally in the provision of a resistance which is selected to have a cold resistance value and a temperature coefficient so that when heated due to current flow from the control unit, the resistor attains an elevated temperature at which the hot resistance value is equal to the desired calibration resistance. This resistance usually is chosen to be equal to the resistance of the heating unit when it is at a temperature corresponding to the desired cut-off point of the electrical temperature control. However, as will later appear, in some cases it may be desirable to choose an arbitrary hot resistance not equal to the hot resistance of the heating unit. Although, as previously mentioned, heating a wire changes its room temperature value; it has been found that regardless of this, the hot resistance remains constant and unaffected by any shift in the cold or room temperature value. In addition, in the present invention the resistor material is selected so that, when an elevated temperature is attained corresponding to the desired hot resistance point, the resistor remains essentially constant in value over a substantial temperature range so that normal variations in line voltage and ambient temperature conditions will not alter the reference resistance beyond tolerated values.

The use of the calibration resistor of the present invention and certain of its characteristics may be more clearly understood by reference to FIG. 1. The electrical control box 1 is ordinarily connected to and governs the supply of energy to a heating pad utilized as previously described at the interior of the tire to be retreaded. The control may be of the type disclosed, for example, in the copending application previously referred to. A calibration unit, designated generally by the numeral 2, is connected to the box by lead 3 between the box plug and the plug 4 connected to the calibration apparatus 2. The control circuit in the box receives power from a commercial source (not shown) by means of leads 5. A resistor 6 is mounted inside the calibrator 2 and looped about the insulators 7 in a conventional manner. According to customary practice, the resistor is stretched to an open coil position at least twice its relaxed length in order to insure reasonable operating life. The resistor is electrically connected to terminals in the receptacles 8 to which the plug 4 may be connected. The receptacles are recessed in the unit 2 behind a sliding door 9. Door 9 is so constructed that when the plug 4 is connected to one of the receptacles 8, and therefore the resistor is connected to electrical power, the other receptacle is safely covered in order to prevent accidental contact with the unused receptacle. Two receptacles are required since the resistor 6 for present purposes is center tapped to provide a reference resistance for a system for retreading passenger car tires and also a system utilizing higher voltages for retreading larger tires such as used on trucks. Obviously, a separate calibration unit could be used for each system. The box 2 is provided with a perforated top 10 which permits air circulation about the resistor 6 to avoid its destruction due to excessive heat. The box 2 and the perforated top 10 are also designed to limit heat dissipation in the resistor so that the resistor remains within the elevated temperature range over which it has a substantially constant value.

In order to possess the characteristics previously mentioned, the resistor 6 is preferably composed of a material known as Nichrome V. Nichrome V is an alloy composed of 80% nickel and 20% chromium. This alloy has a substantial thermal coefficient of resistance in the lower temperature range but an approximately zero coefficient in the temperature range from about 700 to 1700° F. Because of this characteristic of the alloy, the resistor 6 exhibits substantially constant value in this temperature range. Furthermore, resistor 6 emits visible radiation in the temperature range of approximately 1000 to 1700° F. Therefore, the box 2 and top 10 may be designed through conventional techniques to provide for a heat dissipation rate in the resistor 6 such that it will remain within either of the temperature ranges mentioned. For the purposes of providing a simple visual check for the inexperienced retread operator, the box is preferably designed to maintain the resistor within the range of emission of visible radiation. Therefore, in operation the operator connects the calibration apparatus 2 to the control 1 and turns the power on. It is only necessary then that he wait until the resistance glows, indicating that it is in the desired temperature range and, hence, at the desired resistance value. He then proceeds to adjust the control apparatus in the box 1 until the control shuts off the resistor. This cut-off point may be indicated by one of a plurality of signal lights shown on the control box. The control box is then accurately calibrated to turn off the heating pad at the temperature determined by the hot resistance value of the calibration resistor 6.

In a typical example, the heating pad resistance for a retread curing temperature of 300° F. was determined to be about 11.1 ohms in order to achieve sufficient wattage output. The calibration resistor was designed to comprise a cold resistance of approximately 10.4 ohms of coiled Nichrome V wire to operate on a nominal 110 vac. The resistor was coiled in such a manner and housed in a box having suitable characteristics in the heat dissipating portion so that heat convection, conduction, and radiation would combine to maintain the resistor in the high temperature, zero thermal coefficient of resistance range previously mentioned. In the example, an air cooled heat dissipating volume 9 x 9½ x 6½ inches was chosen and the resistor was formed of #18 wire in a ¼ inch diameter coil stretched to about twice its closed length so that the resistor operated at approximately 1100 to 1200° F., or in the dull-red heat range. This temperature is also at about the mid-point of the zero coefficient range of Nichrome V, which provides substantially constant resistance within the range even though the line voltage and ambient temperature may fluctuate considerably. A slightly smaller heat dissipation volume or a tighter coil may be provided to increase the running temperature somewhat to enhance the visual radiation signal if desired. It will be noted that the high side of the zero coefficient range of Nichrome V is about in the incipient-yellow heat range and well below its melting point. If during operation the resistor color approaches yellow, the operator is at once aware that he is operating dangerously close to the high side of the zero coefficient range and that the line voltage and thermal environment should be investigated in order to assure accurate calibration of the control.

Other alloys such as a material known as Manganin may be used in place of Nichrome V. However, Manganin, which is a copper-manganese-nickel alloy, has a substantially zero thermal coefficient of resistance only in the range from room temperature to about 200° F. Hence, an enclosure and the associated resistor would have to be extremely large and bulky in order to dissipate sufficient heat to remain within this temperature range of substantially constant resistance. It is obvious, of course, that such a resistor would not emit visual radiation, as will Nichrome V, to provide a visual signal to the operator.

Figure 2:
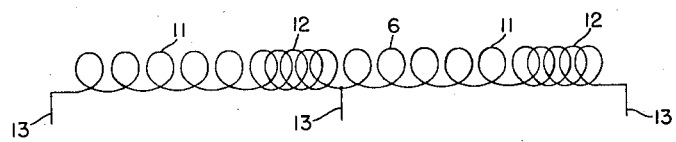
FIG. 2 is an electrical schematic of one type of calibration device made according to the present invention.

FIG. 2 illustrates schematically the resistor 6 shown in the calibration box 2 in FIG. 1 with certain modifications. Resistor 6 comprises a series of spaced-apart coils 11. In one form of the calibration resistor, certain of the coils 11 may be more closely spaced than others, as at the points 12, for reasons which will be subsequently explained. The resistor 6 is provided with three taps or connections 13 so that one half segment of the resistor may be used to calibrate a passenger car retreading system and the entire resistor may be utilized to calibrate a higher voltage truck tire retreading system. The leads 13 are electrically connected to the receptacles 8 in the box 2 of FIG. 1 to make the desired connections to the controller 1.

Figure 3:
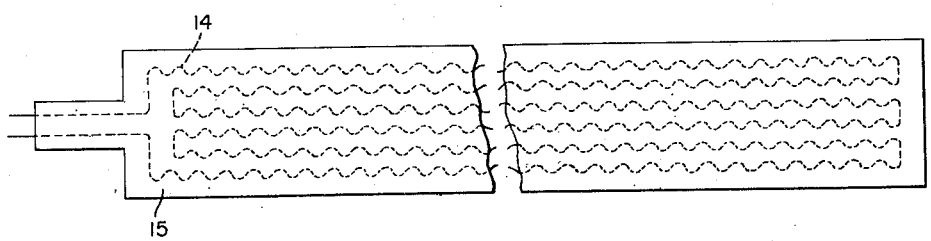
FIG. 3 schematically illustrates a heating pad or band utilized in a retread system in conjunction with an electrical control such as shown in FIG. 1.

FIG. 3 illustrates schematically the electrical circuit for a typical heating element or band used on the inside of a tire to be retreaded. The band comprises generally a sinuous wire 14 passed back and forth to form a substantially continuous heating element which is embedded in an elastomer 15. The wire 14 may be covered with various materials, such as fiber glass, to permit relatively easy motion between the wire and enclosing elastomer during expansion and contraction of the wire due to heating and cooling.

In electrical control systems, such as previously referred to, the control or switching element often used is a thyratron tube. As is well known, a thyratron is a gas filled grid controlled tube which is non-conducting while the gas is in an un-ionized state and becomes fully conductive upon ionization thereof. The gas in the tube is usually maintained in an un-ionized condition through the use of a control grid by conventional means. However, when the control grid is driven sufficiently positive by a suitable signal, the gas ionizes due to the cathode to anode potential across the tube, and the grid loses control. The grid cannot regain control until the plate is driven sufficiently negative to deionize the gas.

It has been found in the development of the present invention that extreme care is necessary in the calibration of controls of the thyratron type due to the high sensitivity of the thyratron to phase shift in the circuit. It would appear then that the use of a coiled wire standard resistor would present some problems during calibration due to the inductive nature of the coil. However, it has been discovered that heating elements utilizing alloys such as Balco wire are somewhat more inductive than the coiled wire resistor, even though the heating pad wire is not coiled but is sinuous in nature. In a typical system, such as is described in the copending applications previously referred to, it has been found that a slight current lag corresponding to a phase angle of approximately 20 minutes exists in the heating pad due to the paramagnetic properties of the wire. Such a lag is small and extremely difficult to detect with ordinary meters and yet seriously affects the calibration of a thyratron trigger controller to the extent that the cut-off point of the heating element may be as much as 20° F. from the desired value. In order to compensate for the inductive nature of heating elements composed of materials similar to Balco wire, it has been found that the resistor coils 11 in FIG. 2 may be wound in such a manner that small segments or portions of them are more closely spaced than others in order to increase the inductive reactance in the resistor so that it is substantially equal in impedance to that of the heating pad. The closely spaced portions may be held in position by a number of means, such as a ceramic clip (not shown) or the like. The number of the closely spaced coils necessary may be easily calculated from measurements of the band inductance. In one example, it was found that the coiled wire resistor normally exhibited an inductive reactance sufficient to produce a phase angle of about 12 minutes lag as compared to the 20 minute angle of the heating pad. Hence, it was necessary to close the coils enough to increase the inductive reactance about 8 minutes. It is possible, of course, to close the entire coil in order to increase the inductance if such a course is preferred over the small pinched portions shown in FIG. 2. However, such a course is somewhat more difficult and also more likely to cause excessive heating in the coil.

Since the phase shift is rather small, the number of compressed turns necessary to provide a slight inductance need not be large. Thus, although some localized heating may occur, it is unlikely that the temperature will approach the upper limit of the zero coefficient range and, hence, the resistance of the calibration load will remain constant. However, if larger inductances are necessary and local hot spots become a problem, other techniques may be used. It should be noted that with the above approach the total D.-C. resistance of the resistor is not changed and thus the resistor may be used interchangeably with phase sensitive and non-phase sensitive controls. In the latter case, of course, the inductance is of slight importance since its phase shift characteristics do not have an affect, and the reactance component is very small in comparison with the resistance so that the total impedance is essentially equal to the ohmic value of the coil.

As an example of an alternative approach, it is possible to couple a capacitor in parallel with the heating pad in order to compensate out the inductive reactance so that the heating band represents a pure resistance to the controller. This technique, however, is not quite as practical since it is difficult to include a capacitor in each band without adversely affecting its physical characteristics.

A further solution to the problem has been successfully used to calibrate a phase sensitive control. In this approach, the cold resistance value of the calibration resistor is adjusted so that, when heated due to current, it reaches the necessary value to trip the control at the desired temperature cut-off point in spite of the reactive component generated in the heating pad or band. This technique avoids the necessity of inserting either inductance or compensating capacitance into the circuit and retains the advantages of the constant resistance hot calibration resistor. However, if the calibrator is to be used with a non-phase sensitive control, an arbitrary adjustment at the control may be necessary in order to compensate for the slight deviation of the calibration load from the correct hot value due to the adjusted cold resistance.

It is preferable in applicable cases to utilize a coiled wire resistor of the type illustrated in FIG. 2 with the small inductance necessary for phase correction provided by a few closely spaced coils. In controls which are not phase sensitive, a resistor without inductive compensation, as illustrated for example in FIG. 1, may be used in order to secure the advantages of constant resistance hot wire calibration and the visual signal effect.

While certain representative embodiments and details have been shown for the purpose of illustrating the invention, it will be apparent to those skilled in this art that various changes and modifications may be made therein without departing from the spirit or scope of the invention.

I claim:

1. A calibration device for establishing the desired cut-off point of a temperature control mechanism for an electrical resistance heating unit in which the resistance varies with temperature, said calibration device comprising, in combination, an electrical calibration resistor having a cold resistance value and a temperature coefficient of resistance such that when connected to said control mechanism and heated due to current flowing therethrough from a power source through said control mechanism the calibration resistor attains a hot ohmic value corresponding to the desired cut-off temperature of said electrical heating unit, said calibration resistor being composed of a material having a substantially zero thermal coefficient of resistance within a substantial elevated temperature range which includes the temperature at which said hot ohmic value is established in said resistor, means to maintain the temperature of said resistor within said range under normal variations in ambient conditions, and means to connect said resistor in series with said control mechanism to act as a calibration load.

2. A device as claimed in claim 1 in which said calibration resistor is composed of an alloy of nickel and chromium in substantially an 80/20 ratio.

3. A device as claimed in claim 1 in which said means to maintain the temperature of said resistor within said range is an enclosure for said resistor.

4. A device as claimed in claim 1 in which said elevated temperature range includes at least a part of the range of incandescence of said resistor.

5. A device as claimed in claim 3 in which said elevated temperature range includes at least a part of the range of incandescence of said resistor.

6. A calibration device for establishing the desired cut-off point of a temperature control mechanism for an electrical resistance heating unit in which the resistance varies with temperature, said calibration device comprising an electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of material having a substantially zero thermal coefficient of resistance within a substantial elevated temperature range which includes the temperature at which the said hot ohmic value is established in said resistor, means to maintain the temperature of said calibration resistor within said range under normal variations in ambient conditions, and means to connect said resistor in series with said control mechanism to act as a calibration load.

7. A device as claimed in claim 6 in which said calibration resistor is composed of an alloy of nickel and chromium in substantially an 80/20 ratio.

8. A device as claimed in claim 6 in which said means to maintain the temperature of said resistor within said range is an enclosure for said resistor.

9. A device as claimed in claim 6 in which said elevated temperature range includes at least a part of the range of incandescence of said resistor.

10. A device as claimed in claim 8 in which said elevated temperature range includes at least a part of the range of incandescence of said resistor.

11. A calibration device for establishing the desired cut-off point of a temperature control mechanism for an electrical resistance heating unit in which the resistance varies with temperature, said calibration device comprising an electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of an alloy of nickel and chromium to have a substantially zero thermal coefficient of resistance within a substantial elevated temperature range, said range including the temperature at which said hot ohmic value is established in said resistor and including at least a part of the range of incandescence of said resistor, enclosure means to maintain the temperature of said calibration resistor within said elevated temperature range, and means to connect said resistor in series with said control mechanism to act as a calibration load.

12. A calibration device for establishing the desired cut-off point of a phase sensitive temperature control mechanism for an electrical resistance heating unit in which the resistance varies with temperature and is composed of an alloy having paramagnetic properties, said calibration device comprising an electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of material having a substantially zero thermal coefficient of resistance within a substantial elevated temperature range, said range including the temperature at which the said hot ohmic value is established in said resistor, inductive means electrically integrated with said resistor and exhibiting sufficient reactance to substantially equal the reactance developed in said electrical heating unit as a result of said paramagnetic property whereby the phase change attributable thereto is substantiall duplicated by said inductive means, means to maintain the temperature af said calibration resistor within said range, and means to connect said resistor in series with said control mechanism to act as a calibration load.

13. A calibration device for establishing the desired cut-off point of a phase sensitive temperature control mechanism for an electrical resistance heating unit in which the resistance varies with temperature and is composed of an alloy having paramagnetic properties, said calibration device comprising a coiled wire electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of material having a substantially zero thermal coefficient of resistance within a substantial elevated temperature range, said range including the temperature at which the said hot ohmic value is established in said resistor, inductive means electrically integrated with said resistor and exhibiting sufficient reactance to substantially equal the reactance developed in said electrical heating unit as a result of said paramagnetic property whereby the phase change attributable thereto is substantially duplicated by said inductive means, said inductive means comprising a closely spaced portion of the coils of said wire resistor, means to maintain the temperature of said calibration resistor within said range, and means to connect said resistor in series with said control mechanism to act as a calibration load.

14. A calibration device for establishing the desired cut-off point of a thyratron actuated temperature control mechanism for an electrical resistance heating unit in which the resistance varies with temperature and is composed of an alloy having paramagnetic properties, said calibration device comprising an electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of material having a substantially constant thermal coefficient of resistance within a substantial elevated temperature range, said range including the temperature at which the said hot ohmic value is established in said resistor, inductive means electrically integrated with said resistor and exhibiting sufficient reactance to substantially equal the reactance developed in said electrical heating unit as a result of said paramagnetic property whereby the phase change attributable thereto is substantially duplicated by said inductive means, means to maintain the temperature of said calibration resistor within said range, and means to connect said resistor in series with said control mechanism to act as a calibration load.

15. A calibration device for establishing the desired cut-off point of a phase sensitive, thyratron actuated temperature control mechanism for an electrical resistance heating unit in which the resistance varies with temperature and is composed of an alloy having paramagnetic properties, said calibration device comprising a coiled wire electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of material having a substantially constant thermal coefficient of resistance within a substantial elevated temperature range, said range including the temperature at which the said hot ohmic value is established in said resistor, inductive means electrically integrated with said resistor and exhibiting sufficient reactance to substantially equal the reactance developed in said electrical heating unit as a result of said paramagnetic property whereby the phase change attributable thereto is substantially duplicated by said inductive means, said inductive means comprising a closely spaced portion of the coils of said wire resistor, means to maintain the temperature of said calibration resistor within said range, and means to connect said resistor in series with said control mechanism to act as a calibration load.

16. A calibration device for establishing the desired cut-off point of a thyratron actuated temperature control mechanism for an electrical resistance heating unit in which the resistance varies with temperature and is composed of an alloy of nickel and iron having strong paramagnetic properties, said calibration device comprising a coiled wire electrical calibration resistor having a cold resistance value and a temperature coefficient of resistance such that when connected to said control mechanism and heated due to current flowing therethrough from a power source through said control mechanism the calibration resistor attains a hot ohmic value equal to the resistance of said electrical unit when said unit reaches the desired cut-off temperature, said calibration resistor being composed of an alloy substantially of 80% nickel and 20% chromium having a substantially constant thermal coefficient of resistance within a substantial elevated temperature range, said range including the temperature to which the said hot ohmic value is established in said resistor and including at least a part of the range of incandescence of said resistor, inductive means electrically integrated with said resistor and exhibiting sufficient reactance to substantially equal the reactance developed in said electrical heated unit as a result of said strong paramagnetic property whereby the phase change attributable thereto is substantially duplicated by said inductive means, said inductive means comprising a closely spaced portion of the coils of said resistor, enclosure means to maintain the temperature of said calibration resistor within said elevated temperature range, and means to connect said resistor in series with said control mechanism to act as a calibration load.

17. A method of establishing a high temperature cut-off point for a controller for an electrical resistance heating unit, said unit having a substantial temperature coefficient of resistance and said controller being sensitive to the resistance in said unit and hence the temperature thereof, comprising the steps of duplicating the hot resistance of said unit by means of a resistor having a substantially zero coefficient of resistance over a substantial elevated temperature range, maintaining said resistor within said temperature range and, hence, within its zone of substantially zero temperature coefficient of resistance and setting said control mechanism to cut off at said resistance value.

18. A method of establishing a high temperature cut-off point for a controller for an electrical resistance heating unit exhibiting a substantial inductive characteristic, said unit having a substantial temperature coefficient of resistance and said controller being sensitive to the resistance in said unit and, hence, the temperature thereof, comprising the steps of duplicating the hot impedance of said unit by means of an electrical element having a resistive component and an inductive component, said resistive component having a substantially zero coefficient of resistance over a substantial elevated temperature range, connecting said electrical element to said controller, maintaining said element within said temperature range and, hence, within its zone of substantially zero temperature coefficient of resistance and setting said control mechanism to cut off at the impedance value represented by the resistive and inductive components achieved at said elevated temperature.

References Cited in the file of this patent
UNITED STATES PATENTS

| 1,245,956 | Northrup | Nov. 6, 1917 |
| 2,388,945 | Barta | Nov. 13, 1945 |
| 2,605,380 | Bauman et al. | July 29, 1952 |
| 2,694,133 | Hack | Nov. 9, 1954 |
| 2,804,532 | Lacy-Hulbert | Aug. 27, 1957 |

OTHER REFERENCES

Pearson: Bell Laboratories Record, December 1940, pp. 106–11.

Soble: Electronic Industries, November 1958, pp. 66, 67.

UNITED STATES PATENT OFFICE
CERTIFICATE OF CORRECTION

Patent No. 3,038,983

June 12, 1962

Robert F. Snyder

It is hereby certified that error appears in the above numbered patent requiring correction and that the said Letters Patent should read as corrected below.

Column 10, line 6, after "range," insert -- connecting said resistor to said controller, --.

Signed and sealed this 30th day of October 1962.

(SEAL)
Attest:

ERNEST W. SWIDER
Attesting Officer

DAVID L. LADD
Commissioner of Patents